United States Patent
Denkin et al.

(10) Patent No.: US 7,038,843 B2
(45) Date of Patent: May 2, 2006

(54) METHOD AND SYSTEM FOR REDUCING RAMAN GAIN TILT ERROR

(75) Inventors: Nathan Myron Denkin, Aberdeen, NJ (US); Magaly Spector, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 306 days.

(21) Appl. No.: 10/645,192

(22) Filed: Aug. 21, 2003

(65) Prior Publication Data

US 2005/0041977 A1    Feb. 24, 2005

(51) Int. Cl.
*H04B 10/12* (2006.01)

(52) U.S. Cl. .................. 359/337.11; 359/334

(58) Field of Classification Search ........... 359/337.11, 359/334; 398/160
See application file for complete search history.

(56) References Cited

U.S. PATENT DOCUMENTS

| | | | |
|---|---|---|---|
| 6,275,313 B1 | 8/2001 | Denkin | 359/124 |
| 6,560,008 B1 * | 5/2003 | Wada | 359/337 |
| 6,577,438 B1 * | 6/2003 | Sugawara et al. | 359/337.11 |
| 6,785,042 B1 * | 8/2004 | Onaka et al. | 359/334 |
| 6,859,306 B1 * | 2/2005 | Fishman et al. | 359/334 |
| 6,891,661 B1 * | 5/2005 | Hayashi et al. | 359/334 |

* cited by examiner

*Primary Examiner*—Mark Hellner (57) ABSTRACT

A method and system in accordance with the present invention greatly reduces the gain error due to Raman gain tilt for individual channels in an optical communication system during a transient event by determining a shift in average power (and thus wavelength) and using the determined shift to alter the average gain in the optical communication system. In various embodiments of the present invention, the average gain of the optical communication system is altered by altering the average gain of an amplifier in the optical communication system. In alternate embodiments of the present invention having an in-line optical filter, the average gain of the optical communication system may be altered by altering the filtering of the optical channels in the optical communication system.

30 Claims, 8 Drawing Sheets

METHOD AND SYSTEM FOR REDUCING RAMAN GAIN TILT ERROR

CROSS-REFERENCE TO RELATED APPLICATIONS

This patent application is related to U.S. Pat. No. 6,275,313 B1, issued Aug. 14, 2001, which is herein incorporated by reference in its entirety.

FIELD OF THE INVENTION

This invention relates to optical communication systems and, more particularly, to a method and system for reducing Raman gain tilt error in optical communication systems.

BACKGROUND OF THE INVENTION

An optical transmission system has to contend with a number of different optical fiber nonlinearities, one of which is commonly referred to as Raman tilt introduced by stimulated Raman scattering (SRS). Stimulated Raman Scattering (SRS) is an important non-linear effect in fibers that can be used to build Raman amplifiers, but that also degrades Wavelength Division Multiplexed (WDM) signals due to channel-to-channel cross talk and spectral distortion (gain tilt). The Raman tilt is defined (in dB) as the difference between the power (in dB) of the longest wavelength channel and the power (in dB) of the shortest wavelength channel. The Raman tilt, or effect, becomes particularly troublesome when an appreciable level of optical power distributed over a certain range of wavelengths is pumped into an optical fiber. In that instance, the Raman gain is tilted in favor of the channels having the longer wavelengths. The Raman effect attenuates the power levels of the optical channels of the lower wavelengths, but increases the power levels of the optical channels of the higher wavelengths by shifting the power from the former channels to the latter channels. The Raman tilt thus degrades the Signal-to-Noise Ratio (SNR) of the signals in the lower wavelength channels and thus seriously degrades their performance.

Typically multi-channel optical transmission systems use broadband optical repeaters to periodically amplify signals. To maximize the number of useful channels and reduce the effects of Raman tilt, a received signal at a repeater may be pre-tilted (i.e., in the opposite direction of the Raman tilt) so as to reduce the variation of Signal-to-Noise Ratio from channel to channel. In addition, when Raman pumps are used for producing gain, the spectrum of the optical channels may also acquire a Raman tilt that requires a repeater with a pre-tilt in the opposite direction. Typically in either case, a repeater with a tilted gain response is used and in general, the repeater is operated in constant gain mode.

However, during transient events (i.e., a sudden change in channel count), individual channel gains may vary by as much as half of the total correction tilt because a constant gain control is used.

SUMMARY OF THE INVENTION

The present invention provides a method and system for the reduction of gain error in an optical communication system due to Raman gain tilt.

In one embodiment of the present invention, a method includes determining a first spectral profile of an input WDM optical signal, filtering the WDM optical signal to produced a filtered WDM optical signal having a second spectral profile, and determining an average loss between the input WDM optical signal and the filtered WDM optical signal using said first and second spectral profiles. The method further includes determining if the determined average loss varies and if the average loss varies, adjusting a gain parameter of the optical communication system such that a respective average power of each of the optical channels present in the WDM optical signal remains substantially constant.

In another embodiment of the present invention an optical communication system includes an outside plant fiber for propagating a WDM optical signal, a first optical detector optically coupled to the outside plant fiber for determining a first spectral profile of an input WDM optical signal, a filter optically coupled to the first optical detector for filtering the WDM optical signal to produced a filtered WDM optical signal having a second spectral profile, a second optical detector for determining the second spectral profile of the filtered WDM optical signal, and an apparatus comprising a memory and a processor. The apparatus of the present invention is adapted to perform the steps of determining an average loss between the WDM optical signal and the filtered WDM optical signal using the first and second spectral profiles, and if the average loss varies, generating a control signal to adjust a gain parameter of the optical communication system such that a respective average power of each of the optical channels present in the WDM optical signal remains substantially constant.

In various embodiments of the present invention, the optical filter in the optical communication system is an in-line optical filter and the gain of the optical communication system is adjusted by adjusting the filtering (tilt) of the optical filter via the generated control signal.

In alternate embodiments of the present invention, the optical communication system comprises an optical amplifier for amplifying the WDM optical signal and if a change in the average loss is detected, the gain of the optical communication system is adjusted by adjusting the average gain of the optical amplifier via the generated control signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although the concepts of the present invention are being illustrated with respect to an optical communication system comprising specific components, such as an erbium-doped fiber amplifier, the concepts of the present invention may be advantageously applied in substantially any optical communication system for the reduction of gain error due to Raman gain tilt during transient events.

Prior art optical communication systems propose various methods and systems for correcting for Raman tilt due to Raman Scattering by tilting the gain of an included optical amplifier in the opposite direction as the Raman tilt. Such a system is described in U.S. Pat. No. 6,456,0427 entitled "Systems and Methods For Reducing A Signal Spectrum Tilt", issued Sep. 24, 2002, which is herein incorporated by reference in its entirety. In such systems at least one of a source, a receiver, and a fiber is connected with an amplifier that is configured to produce a gain spectrum with a tilt that has an opposite sign as a tilt produced by Raman scattering. As such the pre-tilt of the amplifier and the tilt induced in the system due to Raman scattering, substantially cancel each other out. The gain of the amplifier is configured to be substantially constant to cancel out the tilt induced in the system due to Raman scattering. However, during a transient event (i.e., a sudden change in channel count), individual channel gains may vary by as much as half of the total correction tilt because a constant gain control is used.

Figure 1:
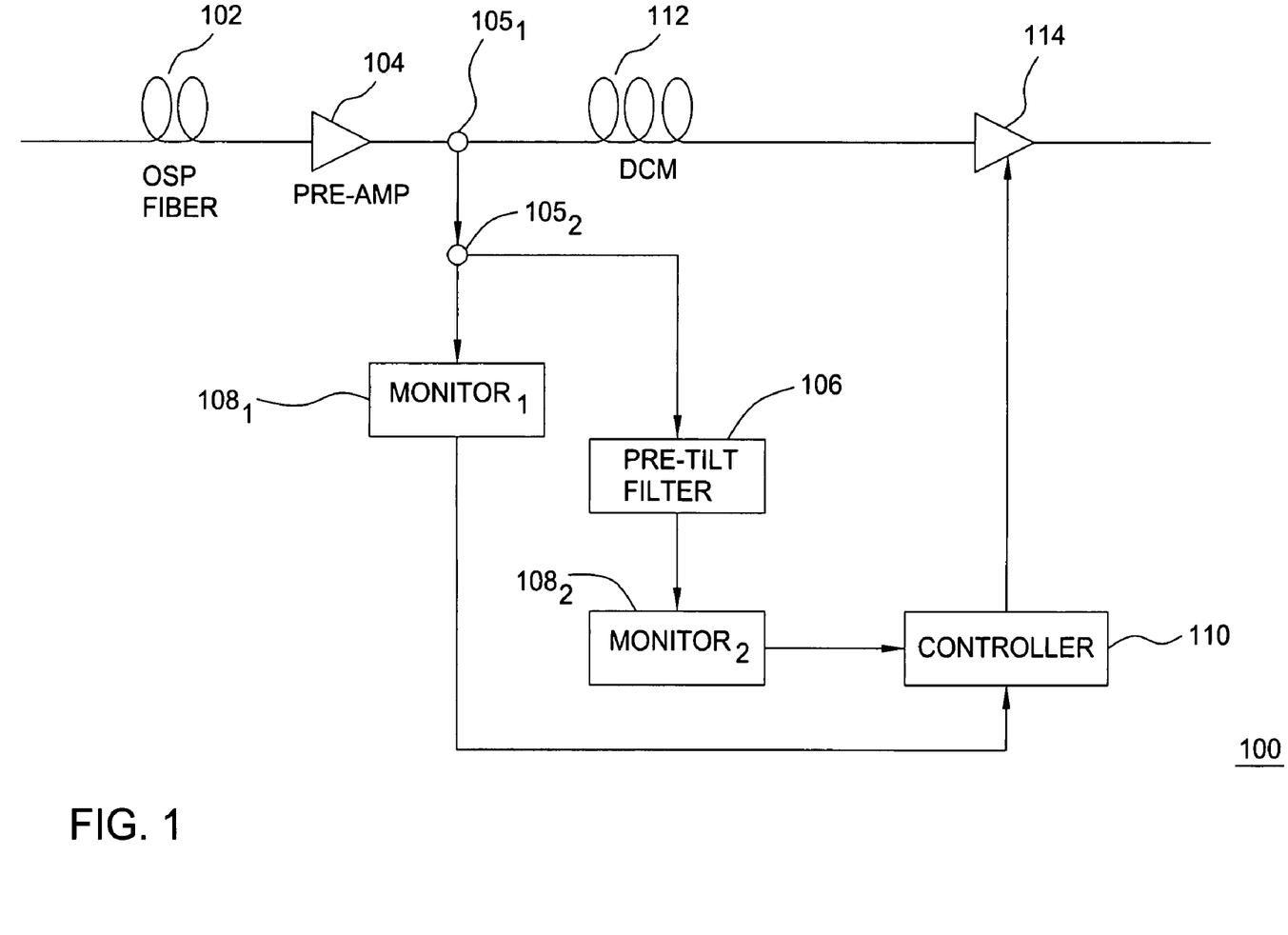
FIG. 1 depicts a high level block diagram of one embodiment of an optical communication system in accordance with the present invention.

In accordance with the present invention, the inventors propose a method and system for the reduction of gain error in an optical communication system due to Raman gain tilt. FIG. 1 depicts a high level block diagram of one embodiment of an optical communication system in accordance with the present invention. The optical communication system 100 of FIG. 1 comprises an outside plant (OSP) fiber 102, a pre-amplifier 104, two optical taps $105_1$, and $105_2$ (collectively taps 105), a pre-tilt filter 106, two optical monitors $108_1$ and $108_2$ (collectively optical monitors 108), a gain controller 110, a dispersion compensating module (DCM) 112, and a post amplifier 114. The pre-amplifier 104 and the post amplifier 114 comprise the first stage and second stage amplifiers, respectively, of an erbium-doped fiber amplifier (EDFA). Although in FIG. 1, the optical communication system 100 is depicted as illustratively comprising two optical monitors $108_1$ and $108_2$, other detectors capable of measuring the optical spectrum of an optical signal, such as optical spectrum analyzers (OSA) and the like, may be implemented in place of the optical monitors in accordance with the present invention. In addition, although in FIG. 1, the optical communication system 100 is depicted as illustratively comprising an EDFA, other optical amplifiers capable of producing a tilted gain may be implemented in place of the EDFA in accordance with the present invention. Furthermore, although the optical communication system 100 is depicted as illustratively comprising optical taps 105, other devices capable of separating a portion of an optical signal, such as optical beam splitters and the like, may be implemented in place of the optical taps 105 in accordance with the present invention.

In the optical communication system 100 of FIG. 1, WDM signals from the OSP fiber 102 are optically coupled to the pre-amplifier 104. The pre-amplifier 104 is configured such that the power per channel of the WDM signals from the OSP fiber 102 remain the same independently of how many channels are in the system. The output of the pre-amplifier 104 is coupled to the DCM 112. The DCM 112 interconnects the pre-amplifier 104 and the post amplifier 114 and provides dispersion compensation for the WDM signals propagating in the optical communication system 100 of FIG. 1. The compensated WDM signals from the DCM 112 are then optically coupled to the post amplifier 114. The post amplifier 114 is configured to provide a pre-tilt to the WDM signals in the optical communication system 100 to compensate for a Raman tilt due to Raman scattering in an OSP fiber such that the power of the optical channels in the WDM signals remain constant. More specifically, the post amplifier 114 provides a tilt to an amplified optical signal having an opposite sign as a Raman tilt due to Raman scattering developed in an optical signal traversing an OSP fiber. In accordance with the present invention, the average gain of the post amplifier 114 is adjusted by a controller, such as the gain controller 110, during a transient event such that the average power of surviving optical channels remains constant. The adjustment of the post amplifier 114 is described in more detail below.

A portion of the optical signal from the pre-amplifier 104 to the DCM 112 is tapped by the tap $105_1$. The portion of the optical signal tapped by the tap $105_1$ is communicated to the first monitor $108_1$. The first monitor $108_1$ measures the optical spectrum of the WDM signal from the pre-amplifier 104 tapped by the tap $105_1$. As described above, the pre-amplifier 104 is configured such that the power per channel of the WDM signals from the OSP fiber 102 remain the same independently of how many channels are in the system.

Figure 2:
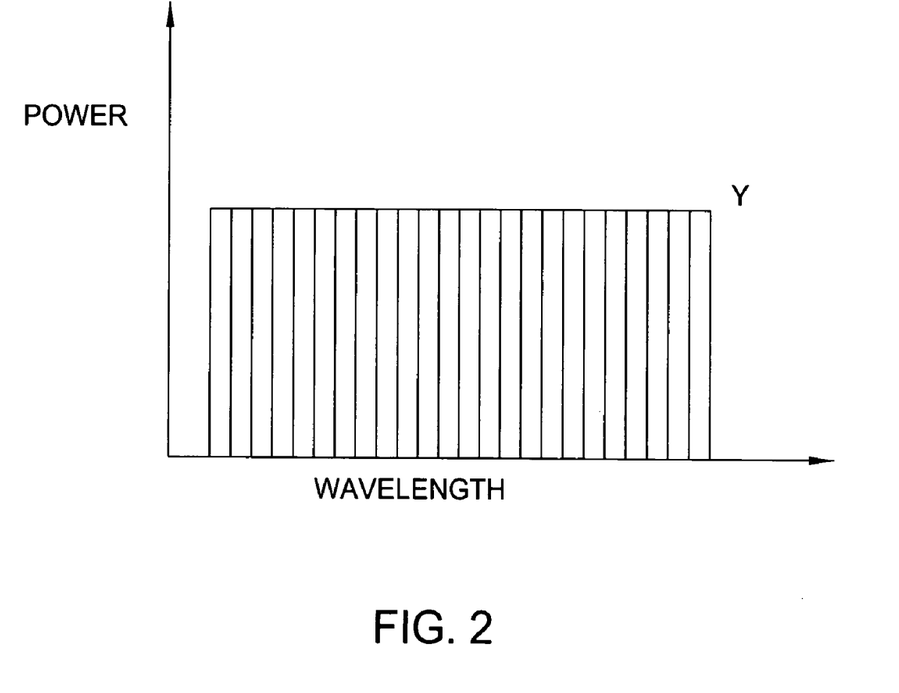
FIG. 2 graphically depicts an exemplary spectrum of a WDM signal measured by a first monitor in the optical communication system of FIG. 1.

FIG. 2 graphically depicts an exemplary spectrum of a WDM signal measured by the first monitor $108_1$. FIG. 2 graphically depicts the optical channel power of the optical channels in the WDM signals from the OSP fiber 102. Illustratively, the optical channels in the WDM signals from the OSP fiber 102 all comprise substantially the same power level and each experience a substantially equal amount of gain in the pre-amplifier 104. As such, and as depicted in FIG. 2, in this embodiment the optical channels in the WDM signals from the OSP fiber 102 are depicted as all having the same power and the pre-amplifier 104 is depicted as comprising a flat gain for ease of understanding. The wavelength distribution of the optical channels in FIG. 2 is depicted as ranging from $\lambda_0$ to $\lambda_N$. It should be noted that, although in FIG. 2 the optical channels are depicted as all comprising the same power level for the ease of understanding discussions and calculations described in detail below, the concepts of the present invention may be applied in optical communication systems having optical channels comprising different power levels.

Referring back to FIG. 1, the spectrum information measured by the optical monitor $108_1$ is then communicated to and stored by the gain controller 110. The gain controller 110 stores the spectrum information to be used in the calculation of a gain offset or adjustment of the post amplifier 114 described in greater detail below.

As depicted in FIG. 1, a portion of the WDM signal from the tap $105_1$ to the first monitor $108_1$ is tapped by the second tap $105_2$. The portion of the optical signal tapped by the tap $105_2$ is communicated to the off-line pre-tilt filter 106. In this embodiment of the present invention, the pre-tilt filter 106 is considered off-line because, advantageously the pre-tilt filter 106 is not included in the communication path of the optical communication system 100. More specifically, the inventors determined that by preferably positioning the pre-tilt filter 106 off-line, the dispersive properties and the loss properties of the pre-tilt filter 106 do not have an effect on the optical communication system 100. That is, if a pre-tilt filter is positioned in the communication path of an optical communication system in accordance with the present invention, the pre-tilt filter would need to possess low dispersive properties and low loss properties so as not to negatively affect the transmission of the optical signals in the optical communication system. Having the pre-tilt filter 106 off-line as depicted in the optical communication system of FIG. 1, allows for the use of a pre-tilt filter that has high loss and is even dispersive. As such, such a pre-tilt filter 106 is easier and cheaper to manufacture.

Although the pre-tilt filter 106 is depicted as being located off-line in the optical communication system 100 of FIG. 1, in other embodiments of the present invention, a pre-tilt filter may be located in-line in an optical communication system in accordance with the present invention. However, such an in-line pre-tilt filter would need to have low loss and low dispersive properties. For example, and in accordance with the present invention, such a low loss and low dispersive pre-tilt filter may be located between a pre-amplifier and a DCM. Such an embodiment of the present invention is described in greater detail below with reference to FIG. 1a.

Referring back to the optical communication system 100 of FIG. 1, in the pre-tilt filter 106, the portion of the WDM signal from the tap $105_1$ to the first monitor $108_1$ tapped by the second tap $105_2$ experiences a predetermined tilt. The predetermined tilt of the pre-tilt filter 106 is configured such that power levels of the optical channels of the WDM signal exhibit a substantially linear distribution. The linear distribution generated by the pre-tilt filter 106 is described in further detail below with reference to FIG. 3.

Figure 3:
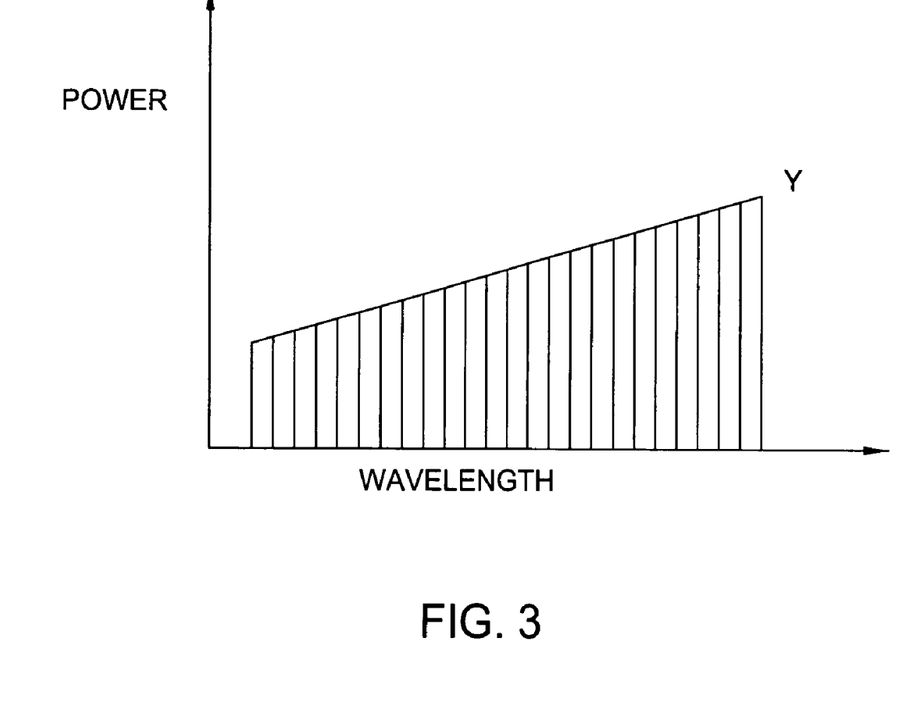
FIG. 3 graphically depicts an exemplary spectrum of a WDM signal measured by a second monitor in the optical communication system of FIG. 1.

The tilted WDM signal from the pre-tilt filter 106 is optically coupled to the second monitor $108_2$. The second monitor $108_2$ measures the optical spectrum of the WDM signal from the pre-tilt filter 106. FIG. 3 graphically depicts an exemplary spectrum of a WDM signal measured by the second monitor $108_2$. FIG. 3 graphically depicts the substantially linear power distribution of the optical channels of the WDM signal generated by the pre-tilt filter 106. In FIG. 3, the optical power of the optical channels is graphed versus the wavelength of the optical channels. The wavelength distribution of the optical channels in FIG. 3 is depicted as ranging from $\lambda_0$ to $\lambda_N$. The power distribution of the optical channels in FIG. 3 is depicted as linearly increasing from $y_0$ to $y_N$. The substantially linear increase of the power in the optical channels is linearly approximated by: $y=m\lambda+b$.

Referring back to the optical communication system 100 of FIG. 1, the spectrum information measured by the second optical monitor $108_2$ is communicated to and stored by the gain controller 110. The substantially linear power distribution of the optical channels of the WDM signal generated by the pre-tilt filter 106 is used by the gain controller 110 in the calculation of a gain offset or adjustment of the post amplifier 114 described in detail below. It should be noted that, although in FIG. 3 the optical channels are depicted as comprising a linearly increasing power distribution, the concepts of the present invention may be applied in instances wherein the optical channels comprise a substantially linearly decreasing power distribution, or other substantially linear power distributions. Furthermore, although in FIG. 3 the optical channels are depicted as comprising a linearly increasing power distribution for ease of understanding, in alternate embodiments of the present invention, a pre-tilt filter may filter a WDM signal such that the optical channels comprise a different distribution, such as an exponential distribution, and in such embodiments of the present invention, a gain controller uses this spectral profile to determine that a transient event has occurred and to calculate an offset or adjustment needed to be applied to the optical communication system, such that an average gain of the surviving channels of the WDM signal in the optical communication system remains constant as described in greater detail below.

As mentioned above, the spectrum information measured by the first optical monitor $108_1$ and the second optical monitor $108_2$ is communicated to and stored by the gain controller 110. The gain controller 110 uses the spectrum information from the optical monitors 108 to determine the occurrence of a transient event and to calculate an offset or adjustment needed to be applied to the post amplifier 114 in response to the transient event, such that an average gain of the surviving channels of the WDM signal in the optical communication system 100 of FIG. 1 remains constant.

Figure 4:
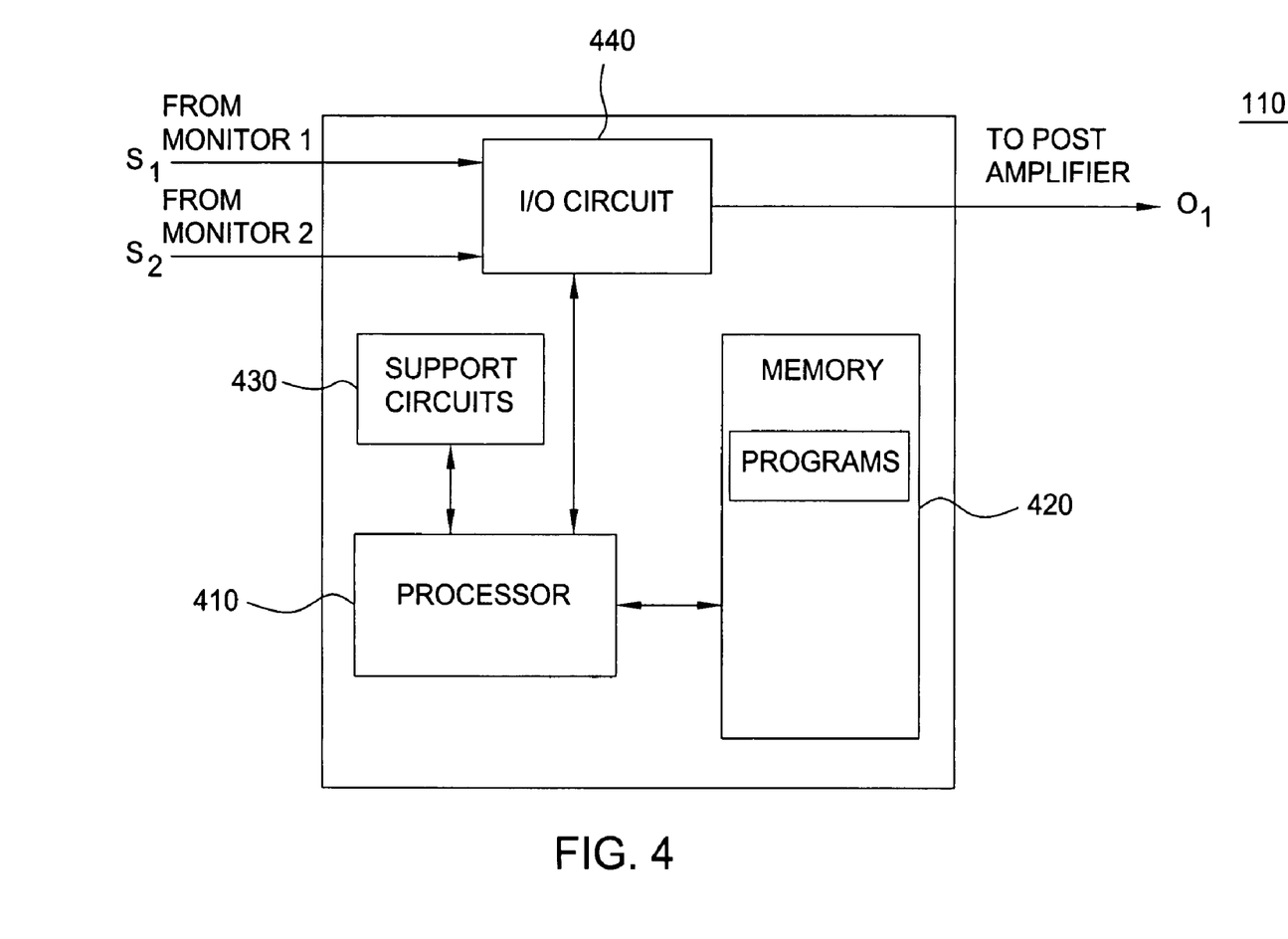
FIG. 4 depicts a high level block diagram of an embodiment of a gain controller suitable for use in the optical communication system of FIG. 1.

FIG. 4 depicts a high level block diagram of an embodiment of a gain controller suitable for use in the optical communication system 100 of FIG. 1. The gain controller 110 of FIG. 4 comprises a processor 410 as well as a memory 420 for storing the algorithms and control programs. The processor 410 cooperates with conventional support circuitry 430 such as power supplies, clock circuits, cache memory and the like as well as circuits that assist in executing the software routines stored in the memory 420. As such, it is contemplated that some of the process steps discussed herein as software processes may be implemented within hardware, for example, as circuitry that cooperates with the processor 410 to perform various steps. The gain controller 110 also contains input-output circuitry 440 that forms an interface between the various functional elements communicating with the gain controller 110. For example, in the embodiment of FIG. 1, the gain controller 110 communicates with the monitors $108_1$ and $108_2$ via signal path S1 and S2 respectively, and with the post amplifier 114 via signal path O1.

Although the gain controller 110 of FIG. 4 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, firmware, hardware, or a combination thereof.

Referring back to FIG. 1, the gain controller 110 uses the spectrum information from the optical monitors 108 to perform calculations to determine the occurrence of a transient event and to calculate an offset or adjustment needed to be applied to the post amplifier 114 in response to the transient event, such that an average gain of the surviving channels of the WDM signal in the optical communication system 100 of FIG. 1 remains constant. For example, in one embodiment of the present invention, the gain controller 110 initially determines the sum of the powers (total power) of the optical channels in the WDM signal from the pre-amplifier 104 using the measured spectrum information from the first optical monitor $108_1$ and equation one (1), which follows:

$$A_{om1} = \sum_{i}^{N} a_i = (N+1)a_0; \quad (1)$$

wherein $A_{om1}$ depicts the total power measured at the first optical monitor $108_1$, the optical channels in the WDM signal range from i to N, and $a_i$ depicts the power of each of the optical channels. Because the power of each of the individual optical channels in this example are all the same, the total power of the optical channels measured by the first optical monitor $108_1$ may be depicted as $(N+1) a_0$, as depicted in equation (1), above.

The gain controller 110 further determines the sum of the powers (total power) of the optical channels in the WDM signal after the substantially linear distribution is generated via the pre-tilt filter by using the measured spectrum information from the second optical monitor $108_2$ and equation two (2), which follows:

$$A_{om2} = \sum_{i}^{N} y_i \quad (2)$$

wherein $A_{om2}$ depicts the total power measured at the second optical monitor $108_2$, the optical channels in the WDM signal range from i to N, and $y_i = m\lambda + b$, wherein m depicts the average change in power divided by the average change in wavelength and b depicts the extrapolated power that would be present for a wavelength equal to zero.

The average channel power of the optical channels measured by the second optical monitor $108_2$ may be depicted as $(y_0+y_N)/2$, and as such the total power may be approximated according to equation three (3), which follows:

$$A_{om2} = (N+1)\frac{y_0 + y_N}{2}. \quad (3)$$

Because $y_0=m\lambda_0+b$ and because $y_N=m\lambda_N+b$, the total power of the optical channels of the optical spectrum measured by the second monitor $108_2$ may be characterized according to equation four (4), which follows:

$$A_{om2} = \frac{(N+1)m(\lambda_0 + \lambda_N) + b}{2}. \quad (4)$$

The average power loss between the WDM signal measured by the first optical monitor $108_1$ and the WDM signal measured by the second monitor $108_2$ is determined by dividing the total power of the optical channels measured by the second monitor $108_2$ by the total power of the optical channels measured by the first monitor $108_1$ (e.g., $A_{om2}/A_{om1}$). As such, substituting the values for the total powers of $A_{om2}$ and $A_{om1}$ from equation (1) and equation (4) above, the average loss between the WDM signal measured by the first optical monitor $108_1$ and the WDM signal measured by the second monitor $108_2$ may be characterized according to equation five (5), which follows:

$$\bar{A}_{loss} = \frac{m(\lambda_0 + \lambda_N) + b}{2a_0} \quad (5)$$

The gain controller 110 may continuously or periodically monitor the value for the average loss determined by, for example, equation (5) above, to determine the occurrence of a transient event. More specifically, if the value for the average loss determined by the gain controller 110 changes, the gain controller 110 determines that a transient event has occurred. A change in the value of the average loss is an indication of a change in the average wavelength of the optical channels present in an optical signal. Although in the optical communication system 100 of FIG. 1 the pre-tilt filter 106 filters the WDM signal and the gain controller 110 determines an average loss, in alternate embodiments of the present invention, a pre-tilt filter may comprise an amplification means and as such impart a gain on the traversing WDM signal and, as such, a gain controller may actually be determining an average gain. As such, any reference to an average loss throughout this disclosure should be interpreted to mean either an average loss or an average gain depending on the embodiment of the present invention.

Figure 5:
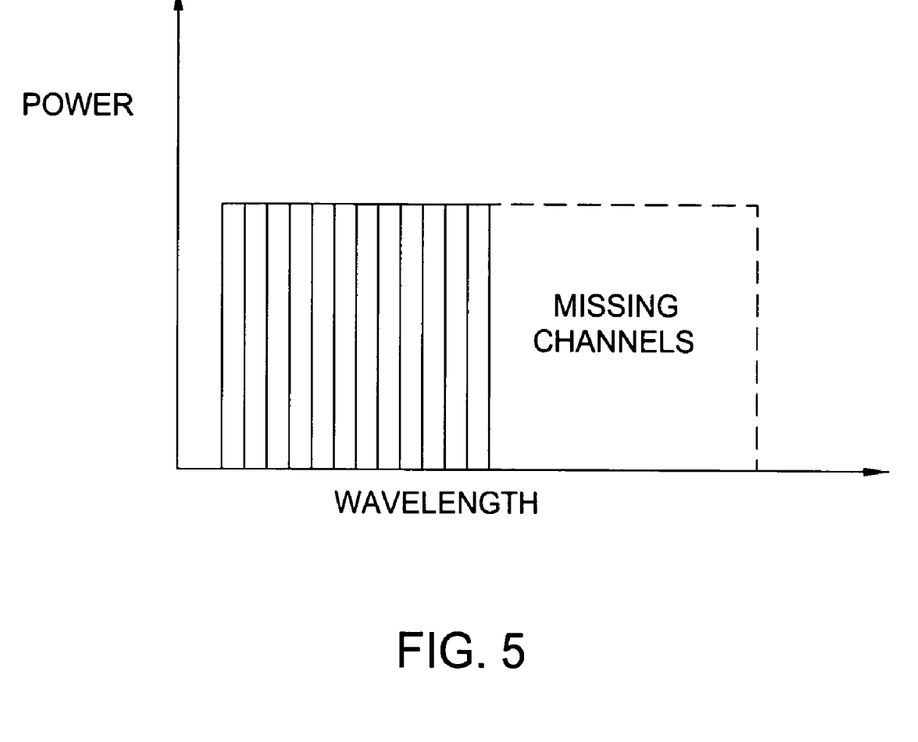
FIG. 5 graphically depicts an exemplary spectrum of a WDM signal measured by the first monitor of the optical communication system of FIG. 1 during a transient event in which the top half of the wavelength channels of the WDM signal from the OSP fiber are no longer present.

For example, FIG. 5 graphically depicts an exemplary spectrum of a WDM signal measured by the first monitor $108_1$ in the optical communication system 100 of FIG. 1 during a transient event in which the top half of the wavelength channels (high wavelengths) of the WDM signal from the OSP fiber 102 are no longer present. FIG. 5 graphically depicts the optical channel power of the optical channels in the WDM signals from the OSP fiber 102. Illustratively, the optical channels in the WDM signals from the OSP fiber 102 all comprise substantially the same power level and each experience a substantially equal amount of gain in the pre-amplifier 104. However, the wavelength distribution of the optical channels in FIG. 5 is depicted as ranging from $\lambda_0$ to $\lambda_{N/2}$, indicating a loss of the top half of the optical channels. As such, for the WDM signal of FIG. 5, the total power of the WDM signal measured by the first monitor $108_1$ previously characterized according to equation (1) is now characterized according to equation six (6), which follows:

$$A'_{om1} = \frac{(N+1)a_0}{2}. \quad (6)$$

Figure 6:
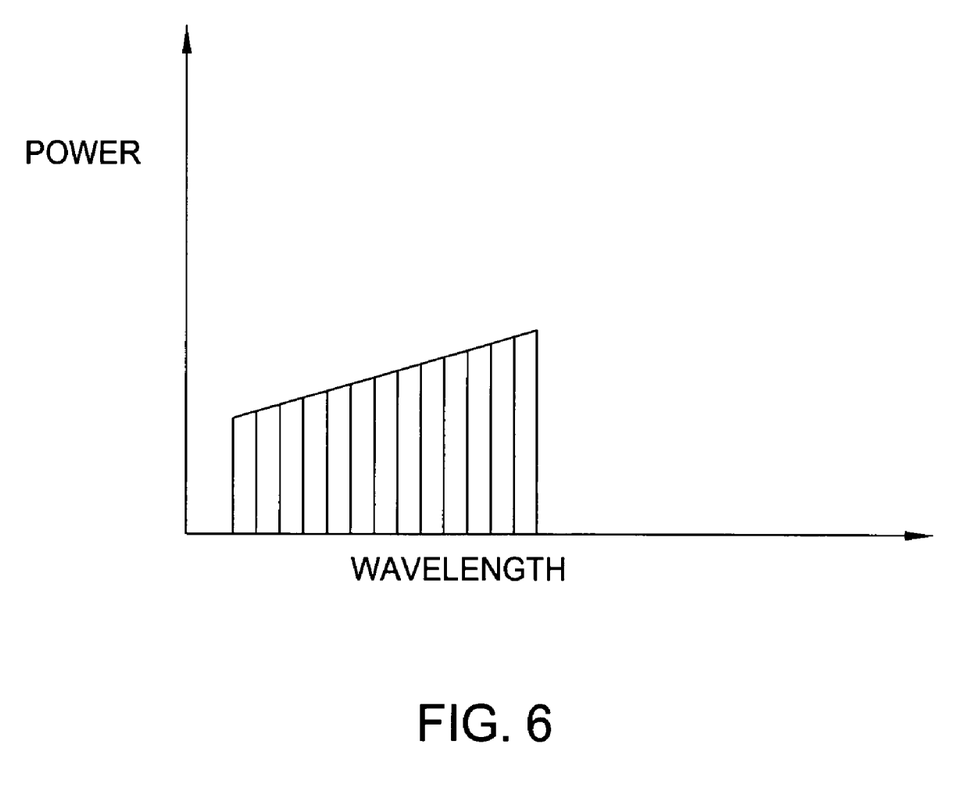
FIG. 6 graphically depicts an exemplary spectrum of the WDM signal of FIG. 5 measured by a second monitor.

FIG. 6 graphically depicts an exemplary spectrum of a WDM signal measured by the second monitor $108_2$ for the case of the WDM signal missing the top half of the optical channels as depicted in FIG. 5. FIG. 6 graphically depicts the substantially linear power distribution of the optical channels of the WDM signal generated by the pre-tilt filter 106. In FIG. 6, the optical power of the optical channels is graphed versus the wavelength of the optical channels. The wavelength distribution of the optical channels in FIG. 6 is depicted as ranging from $\lambda_0$ to $\lambda_{N/2}$ indicating the loss of the top half of the optical channels of the WDM signal. The power distribution of the optical channels in FIG. 6 is depicted as linearly increasing from $y_0$ to $y_{N/2}$. As evident in FIG. 6, the loss of the top half of the optical channels results in a change in the average power of the optical channels. Again, and as described previously with reference to FIG. 3 above, the substantially linear increase of the power in the optical channels of FIG. 6 is linearly approximated by:

y=λm+b. As such, for the WDM signal of FIG. 6, the total power of the WDM signal measured by the second monitor $108_2$ previously characterized according to equation (4) is now characterized according to equation seven (7), which follows:

$$A_{om2} = \frac{(N+1)m(\lambda_0 + \lambda_{N/2}) + b}{4}. \tag{7}$$

As such, the average power loss between the WDM signal measured by the first optical monitor $108_1$ and the WDM signal measured by the second monitor $108_2$ previously characterized according to equation (5) is now characterized according to equation eight (8), which follows:

$$\overline{A}_{loss} = \frac{m(\lambda_0 + \lambda_{N/2}) + b}{2a_0}. \tag{8}$$

By monitoring the value for the average power loss, the gain controller may determine if a transient event has occurred by determining that a change in the average power loss between the WDM signal measured by the first optical monitor $108_1$ and the WDM signal measured by the second monitor $108_2$ has occurred. The determination of a change in the average power loss advantageously indicates a loss (or addition) of optical channels and thus a possible shift in the optical spectrum of a WDM signal, and not just merely a change in the average power of the optical channels of a WDM signal.

After determining that a change in the average power loss between the WDM signal measured by the first optical monitor $108_1$ and the WDM signal measured by the second monitor $108_2$ has occurred, and thus that a transient event has occurred, the gain controller 110 uses information regarding the average power of the surviving optical channels to determine an amount of gain change or offset for the post amplifier 114 of the optical communication system 100 of FIG. 1, such that the average optical power of each of the individual surviving optical channels remains substantially the same as the average power of each of those individual optical channels at the input of the optical communication system, disregarding any tilt that needs to be added by the pre-amplifier 104 or the post amplifier 114 to correct for a Raman tilt generated within a subsequent OSP fiber. The gain controller 110 sends a control signal to the post amplifier 114 proportional to the amount of gain change necessary in the post amplifier 114 to adjust the gain of the post amplifier 114 such that the average optical power of each of the individual surviving optical channels propagating out of the optical communication system 100 remains substantially the same as the power of the optical channels when entering the optical communication system 100.

The value of the control signal generated by the gain controller 110 may be calibrated to be proportional to the amount of the shift of the average optical power of the linearly distributed optical channels measured by the second optical tap $108_2$. More specifically, the gain controller 110 may be calibrated by iteratively removing single ones and all possible combinations of the optical channels in the WDM signal from the OSP fiber 102 and storing the shifts in the average optical power of the linearly distributed optical channels measured by the second optical tap $108_2$ for each of the possibilities. These shifts may then be correlated to a specific amount of gain adjustment necessary for the post amplifier 114 such that the average optical power of each of the individual surviving optical channels propagating out of the optical communication system 100 remains substantially the same as the average power of each of those individual optical channels at the input of the optical communication system. As such during normal operation, the gain controller 110 may properly adjust the gain of the post amplifier 114 a predetermined amount necessary to correct for a transient event.

It should be noted that it may be possible that during some transient event, middle channels may no longer be present and the optical channels at the extremes may remain. As such, the solution determined by the present invention will be the best possible solution for the channels remaining, even though the average power of each of the optical channels will not remain substantially the same. That is, the error in the surviving optical channels in an optical communication system in accordance with the present invention during a transient event will be minimized by the concepts of the present invention when a true solution for adjusting the gain of an amplifier such that the average optical power of each of the individual surviving optical channels propagating out of the optical communication system remains substantially the same as the average power of each of those individual optical channels at the input of the optical communication system is not available.

Figure 1A:
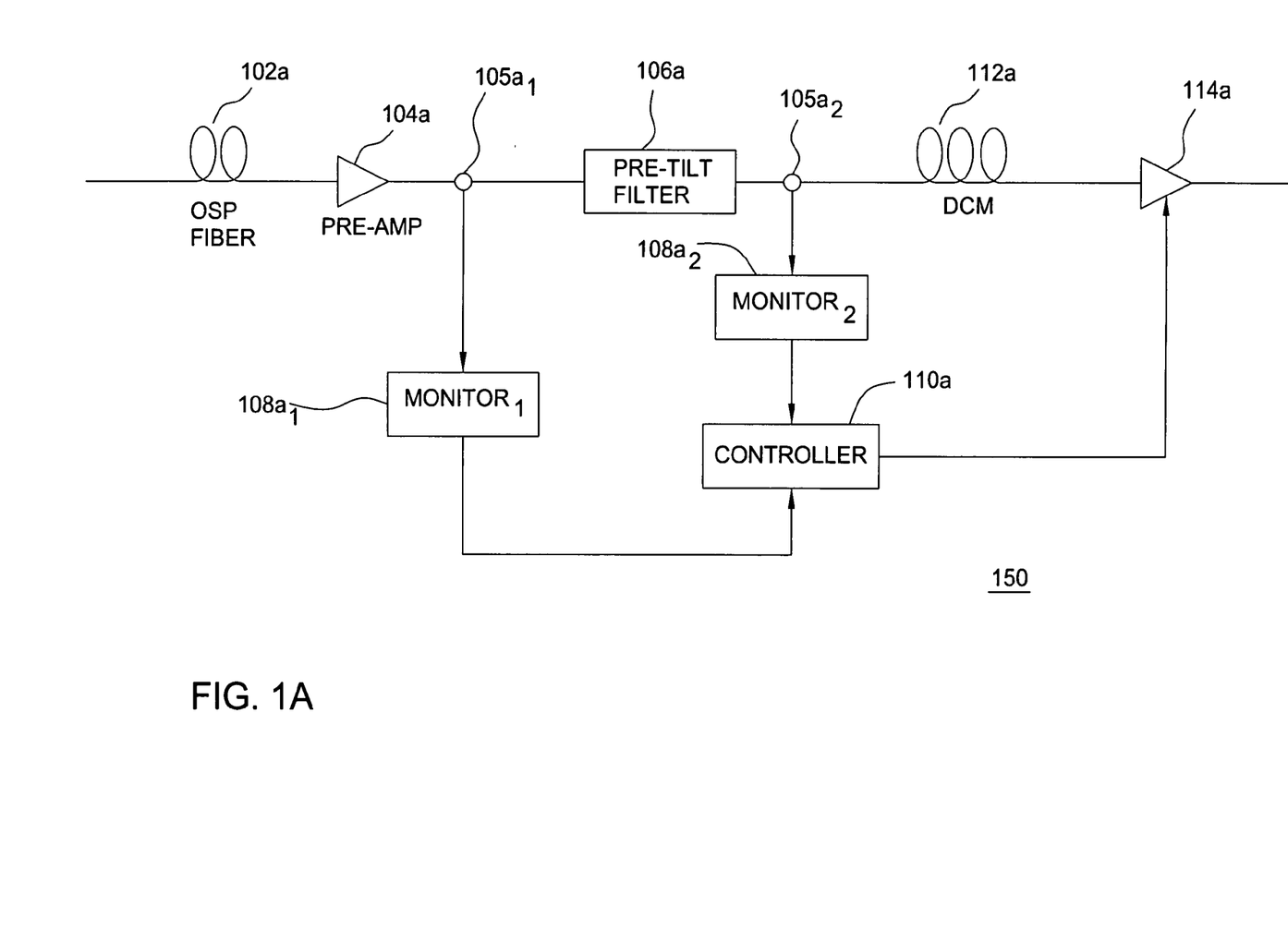
FIG. 1a depicts a high level block diagram of an alternate embodiment of the optical communication system of FIG. 1 having the pre-tilt filter in an in-line configuration.

FIG. 1a depicts a high level block diagram of an alternate embodiment of the optical communication system 100 of FIG. 1 having the pre-tilt filter in an in-line configuration. In the optical communication system 150 of FIG. 1a, substantially the same components are used as in the depiction of FIG. 1, but the arrangements of the components are different. As such, similar reference numbers are used to refer to the respective components, but the alternate locations for the components are depicted in FIG. 1a. The optical communication system 150 of FIG. 1a comprises an outside plant (OSP) fiber 102a, a pre-amplifier 104a, two optical taps $105a_1$, and $105a_2$ (collectively taps 105a), a pre-tilt filter 106a, two optical monitors $108a_1$ and $108a_2$ (collectively optical monitors 108a), a gain controller 110a, a dispersion compensating module (DCM) 112a, and a post amplifier 114a. The pre-amplifier 104a and the post amplifier 114a comprise the first stage and second stage amplifiers, respectively, of an erbium-doped fiber amplifier (EDFA).

In the optical communication system 150 of FIG. 1a, WDM signals from the OSP fiber 102a are optically coupled to the pre-amplifier 104a. The pre-amplifier 104a is configured such that the power per channel of the WDM signals from the OSP fiber 102a remain the same independently of how many channels are in the system. The output of the pre-amplifier 104a is coupled to the pre-tilt filter 106a. In the pre-tilt filter 106a, the optical signal experiences a predetermined tilt typically to correct for gain error in a subsequent OSP. The output of the pre-tilt filter 106a is coupled to the DCM 112a. The DCM 112a interconnects the pre-amplifier 104a and the post amplifier 114a and provides dispersion compensation for the WDM signals propagating in the optical communication system 150 of FIG. 1a. The compensated WDM signals from the DCM 112a are then optically coupled to the post amplifier 114a. The post amplifier 114a is configured to provide second stage amplification to the optical signals. In the optical communication system 150 of FIG. 1a, a portion of the optical signal from the pre-amplifier 104a to the DCM 112a is tapped by the tap $105a_1$. The portion of the optical signal tapped by the tap $105a_1$ is communicated to the first monitor $108a_1$. The first monitor $108a_1$ measures the optical spectrum of the WDM signal from the pre-amplifier 104a tapped by the tap 105a$_1$. The spectrum information measured by the optical monitor 108a$_1$ is then communicated to and stored by the gain controller 110a. The gain controller 110a stores the spectrum information from the optical monitor 108a$_1$.

A portion of the optical signal from the DCM 112a to the post amplifier 114a is tapped by the tap 105a$_2$. The portion of the optical signal tapped by the tap 105a$_2$ is communicated to the second monitor 108a$_2$. The second monitor 108a$_2$ measures the optical spectrum of the WDM signal from the DCM 112a tapped by the tap 105a$_2$. The spectrum information measured by the optical monitor 108a$_2$ is then communicated to and stored by the gain controller 110a. The function and operation of the gain controller 110a is substantially identical to the function and operation of the gain controller 110 of FIG. 1. More specifically, the gain controller 110a uses the spectrum information from the optical monitors 108a to determine the occurrence of a transient event and to calculate an offset or adjustment needed to be applied to the post amplifier 114a in response to the transient event, such that an average gain of the surviving channels of the WDM signal in the optical communication system 150 of FIG. 1a remains constant as described above for the optical communication system 100 of FIG. 1.

In alternate embodiments of the optical communication system 150 of FIG. 1a however, a gain controller of the present invention may adjust an in-line pre-tilt filter such that an average gain of the surviving channels of the WDM signal in the optical communication system remains constant during a transient event. More specifically, the pre-tilt filter of the present invention may be adjusted by a control signal from the gain controller to adjust the tilt (filtering) provided by the pre-tilt filter to the WDM signals in the optical communication system such that the average optical power of each of the individual surviving optical channels remains substantially the same as the average power of each of those individual optical channels at the input of the optical communication system during a transient event. In such embodiments of the present invention, the pre-tilt filter may optionally include an optical attenuator for adjusting the power of the optical signals traversing said pre-tilt filter. Alternatively, the pre-tilt filter may comprise a tunable filter wherein the slope of the tilt generated by the pre-tilt filter upon traversing optical channels is adjustable via a control signal from a gain controller of the present invention.

In alternate embodiments of the present invention, the control signal generated by the gain controller is communicated to the pre-amplifier of an optical communication system of the present invention to adjust the gain of the pre-amplifier such that the average optical power of each of the individual surviving optical channels propagating out of the optical communication system 100 remains substantially the same as the average power of each of those individual optical channels at the input of the optical communication system as described above. More specifically, a control signal generated by a gain controller in accordance with the present invention in response to the determination of a change in the average power loss between a WDM signal measured by a first optical monitor and a WDM signal measured by the second monitor, thus indicating a transient event, is communicated to a pre-amplifier of an EDFA to adjust the gain of the pre-amplifier such that the average optical power of each of the individual surviving optical channels propagating out of an optical communication system in accordance with the present invention remains substantially the same as the average power of each of those individual optical channels at the input of the optical communication system.

Even further, in alternate embodiments of the present invention, an optical communication system comprises a single-stage amplifier and a control signal generated by a gain controller in accordance with the present invention is communicated to the single-stage amplifier to adjust the gain of the single-stage amplifier such that the average optical power of each of the individual surviving optical channels propagating out of the optical communication system remains substantially the same as the average power of each of those individual optical channels at the input of the optical communication system as described above.

Figure 7:
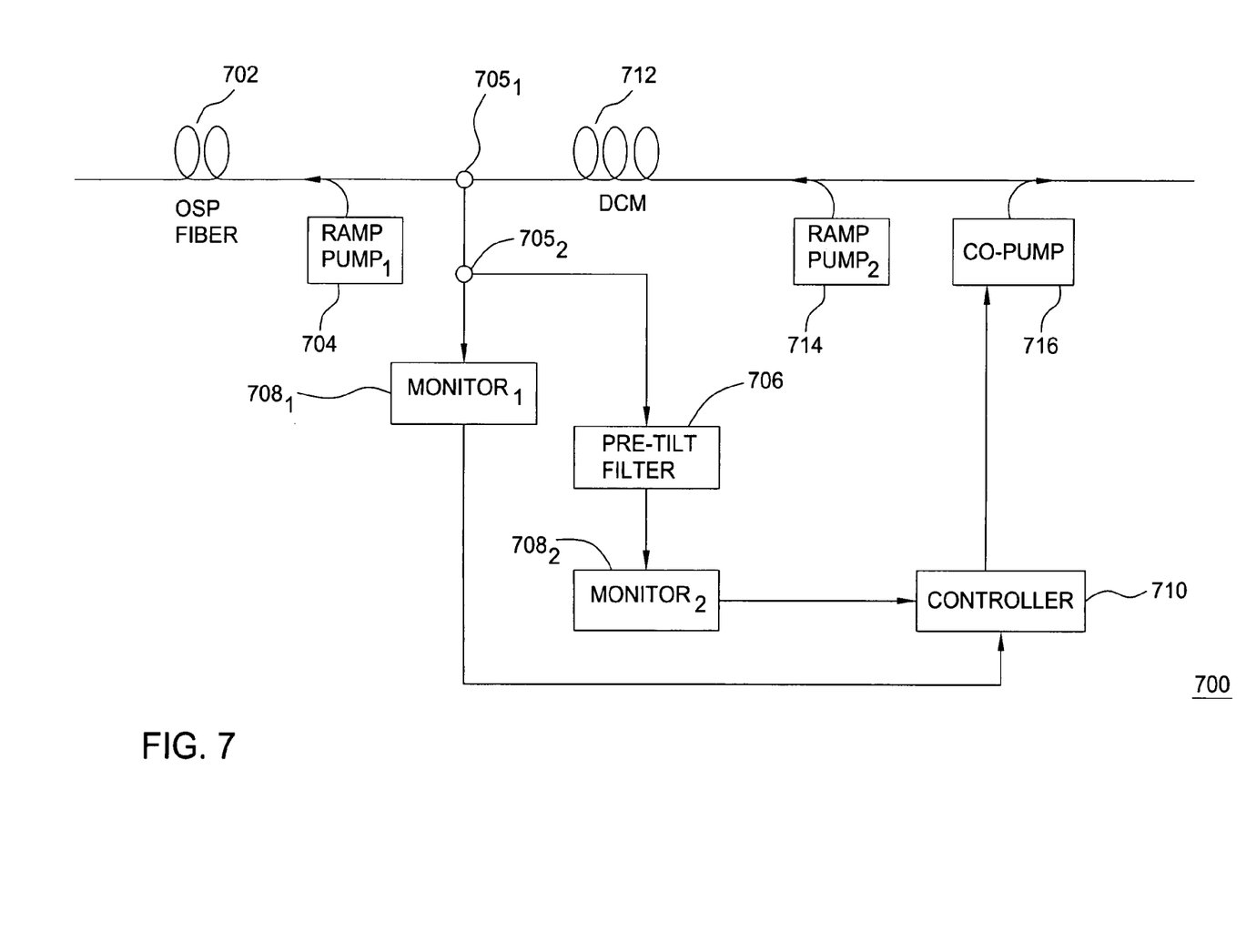
FIG. 7 depicts a high level block diagram of an embodiment of an all-Raman amplified optical communication system in accordance with the present invention.

The concepts of the present invention may also be applied in optical communication systems comprising all-Raman amplifiers. For example, FIG. 7 depicts a high level block diagram of an embodiment of an all-Raman amplified optical communication system in accordance with the present invention. The optical communication system 700 of FIG. 7 comprises an outside plant (OSP) fiber 702, a first block of Raman pumps 704, two optical taps 705$_1$, and 705$_2$ (collectively taps 705), a pre-tilt filter 706, two optical monitors 708$_1$ and 708$_2$ (collectively optical monitors 708), a gain controller 710, a dispersion compensating module (DCM) 712, a second block of Raman pumps 714, and a block of co-propagating Raman pumps 716. Although in FIG. 7, the optical communication system 700 is depicted as illustratively comprising three blocks of Raman pumps, each of the Raman pump blocks may advantageously comprise a single Raman pump or a plurality of Raman pumps in accordance with the present invention. Furthermore, although the optical communication system 700 is depicted as illustratively comprising two optical monitors 708$_1$ and 708$_2$, other detectors capable of measuring the optical spectrum of an optical signal, such as optical spectrum analyzers (OSA) and the like, may be implemented in place of the optical monitors in accordance with the present invention. Even further, although the optical communication system 700 is depicted as illustratively comprising optical taps 705, other devices capable of separating a portion of an optical signal, such as optical beam splitters and the like, may be implemented in place of the optical taps 705 in accordance with the present invention.

The functions of the components of the optical communication system 700 of FIG. 7 are substantially identical to those respective components of the optical communication system 100 of FIG. 1. However, in the optical communication system 700 of FIG. 7, the control signal generated by the gain controller 710 is communicated to the co-propagating Raman pump block 716 to adjust the gain within the optical communication system 700 such that the average optical power of each of the individual surviving optical channels propagating out of the optical communication system 700 remains substantially the same as the average power of each of those individual optical channels at the input of the optical communication system, as described above.

Although in the optical communication system of FIG. 7, the control signal from the gain controller 710 is depicted as being communicated to the co-propagating Raman pump block 716, the control signal from the gain controller 710 may be communicated to one of the Raman pump blocks 704 or 714 or any combination of the Raman pump blocks 704, 714 and the co-propagating Raman pump block 716 in accordance with the present invention to adjust the gain within the optical communication system 700 such that the average optical power of each of the individual surviving optical channels propagating out of the optical communication system 700 remains substantially the same as the average power of each of those individual optical channels at the input of the optical communication system as described above. More specifically, a control signal generated by the gain controller 710 in response to the determination of a change in the average power loss between a WDM signal measured by the first optical monitor $708_1$ and a WDM signal measured by the second optical monitor $708_2$, thus indicating a transient event, is communicated to one or any combination of the Raman pump blocks 704, 714, 716 to adjust the gain within the optical communication system 700 such that the average optical power of each of the individual surviving optical channels propagating out of an optical communication system in accordance with the present invention remains substantially the same as the average power of each of those individual optical channels at the input of the optical communication system.

Also within the concepts of the present invention, a parameter of one or more of the pump or pumps of the Raman pump blocks 704, 714 or 716 may be adjusted to adjust the gain of the optical communication system 700 such that the average optical power of each of the individual surviving optical channels propagating out of an optical communication system in accordance with the present invention remains substantially the same as the average power of each of those individual optical channels at the input of the optical communication system. The parameters of the Raman pump blocks 704, 714 or 716 that are adjusted may include the power of the pumps of the Raman pump blocks 704, 714 or 716 or the wavelengths of the pumps of the Raman pump blocks 704, 714 or 716. Even further, the adjustment of the parameters may be made to one or any of a combination of the pumps of a single Raman pump block or to one or any of a combination of the pumps of any of the Raman pump blocks 704, 714 or 716.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for controlling Raman gain tilt in a WDM optical communication system, comprising:
   determining a first spectral profile of an input WDM optical signal;
   filtering the WDM optical signal to produced a filtered WDM optical signal having a second spectral profile;
   determining an average loss between the input WDM optical signal and the filtered WDM optical signal using said first and second spectral profiles; and
   if the average loss varies, adjusting a gain parameter of the optical communication system such that a respective average power of each of the optical channels present in the WDM optical signal remains substantially constant, wherein a change in the average loss is due to a transient event.

2. The method of claim 1, wherein said second spectral profile comprises a substantially linearly increasing gain profile.

3. The method of claim 1, wherein said second spectral profile comprises a substantially linearly decreasing gain profile.

4. The method of claim 1, wherein the gain parameter of the optical communication system is adjusted such that the respective average power of each of the surviving optical channels remains substantially constant.

5. The method of claim 1, wherein the gain of the optical communication system is adjusted by adjusting the gain of an amplifier of said optical communication system.

6. The method of claim 1, wherein the filtering is performed in-line in the optical communication system and the gain of the optical communication system is adjusted by adjusting the filtering of said WDM optical signal.

7. The method of claim 1, wherein an amount of gain adjustment required is proportional to the amount of change in the average loss.

8. The method of claim 1, wherein the gain of the optical communication system is adjusted by a predetermined amount respective of the amount of change in the average loss.

9. The method of claim 8, wherein said predetermined amount of gain adjustment is determined by a method, comprising:
   determining an average loss between an input WDM optical signal and a filtered WDM optical signal for the case of when all optical channels are present in the WDM optical signal;
   determining an average loss between an input WDM optical signal and a filtered WDM optical signal for all other possible combinations of optical channels in the input WDM optical signal;
   determining a respective amount of change in loss between the average loss for the case of when all optical channels are present in said WDM optical signal and the average loss for each of the combinations of optical channels;
   for each determined amount of change in loss, determining an amount or gain adjustment necessary for the optical communication system such that a respective average power of each of the optical channels present in the input WDM optical signal remains substantially constant; and
   associating each determined amount of change in loss with a respective determined amount of gain adjustment necessary for the optical communication system.

10. An optical communication system, comprising:
    a first optical detector for determining a first spectral profile of an input WDM optical signal;
    a filter for filtering the WDM optical signal to produced a filtered WDM optical signal having a second spectral profile;
    a second optical detector for determining the second spectral profile of the filtered WDM optical signal; and
    a controller comprising a memory and a processor, said controller adapted to perform the steps of:
      determining an average loss between the WDM optical signal and the filtered WDM optical signal using said first and second spectral profiles; and
      if the average loss varies, generating a control signal to adjust a gain parameter of the optical communication system such that a respective average power of each of the optical channels present in the WDM optical signal remains substantially constant, wherein a change in the average loss is due to a transient event.

11. The optical communication system of claim 10, further comprising an outside plant fiber for propagating said input WDM optical signal to said first optical detector.

12. The optical communication system of claim 10, wherein said first optical detector and said second optical detector comprise optical monitors.

13. The optical communication system of claim 10, further comprising an optical amplifier for amplifying the WDM optical signal such that the power per channel of the WDM optical signal remains substantially the same Independently of how many channels are in the WDM optical signal.

14. The optical communication system of claim 13, wherein the gain of said optical communication system is adjusted by adjusting the average gain of said amplifier via said generated control signal.

15. The optical communication system of claim 13, wherein said amplifier comprises an erbium-doped fiber amplifier (EDFA) comprising a pre-amplifier and a post amplifier.

16. The optical communication system of claim 15, wherein the gain of said optical communication system is adjusted by adjusting the gain of said pre-amplifier of said EDFA via said generated control signal.

17. The optical communication system of claim 15, wherein the gain of said optical communication system is adjusted by adjusting the gain of said post amplifier of said EDFA via said generated control signal.

18. The optical communication system of claim 10, wherein said filter is in-line in said optical communication system and the gain of said optical communication system is adjusted by adjusting the filtering of said in-line filter via said generated control signal.

19. The optical communication system of claim 18, wherein said in-line filter further comprises an optical attenuator.

20. The optical communication system of claim 19, wherein the gain of said optical communication system is adjusted by adjusting said optical attenuator via said generated control signal such that the average power of each of the optical channels present in the optical signal remains substantially constant.

21. The optical communication system of claim 10, wherein said filter comprises a pre-tilt filter.

22. The optical communication system of claim 10, further comprising at least one counter-propagating Raman pump block and at least one co-propagating Raman pump block for amplifying the WDM optical signal.

23. The optical communication system of claim 22, wherein the gain of said optical communication system is adjusted by adjusting the power of said at least one counter-propagating Raman pump block via said generated control signal.

24. The optical communication system of claim 22, wherein the gain of said optical communication system is adjusted by adjusting the power of said at least one co-propagating Raman pump block via said generated control signal.

25. The optical communication system of claim 22, wherein the gain of said optical communication system is adjusted by adjusting the power of a combination of said at least one counter-propagating Raman pump block and said at least one co-propagating Raman pump block via said generated control signal.

26. The optical communication system of claim 10, further comprising a dispersion compensating module for providing dispersion compensation for the WDM optical signal propagating in the optical communication system.

27. An apparatus comprising a memory and a processor, said apparatus adapted to perform the steps of:
    determining an average loss between a WDM optical signal and a filtered WDM optical signal; and
    if the determined average loss varies, generating a control signal to adjust a gain parameter of an optical communication system such that a respective average power of each of the optical channels present in the WDM optical signal remains substantially constant, wherein a change in the average loss is due to a transient event.

28. An optical communication system, comprising:
    a means for determining a first spectral profile of an input WDM optical signal;
    a means for filtering the WDM optical signal to produced a filtered WDM optical signal having a second spectral profile;
    a means for determining the second spectral profile of the filtered WDM optical signal;
    a means for determining an average loss between the WDM optical signal and the filtered WDM optical signal using said first and second spectral profiles; and
    a means for generating, if the average loss varies, a control signal to adjust a gain parameter of the optical communication system such that a respective average power of each of the optical channels present in the WDM optical signal remains substantially constant, wherein a change in the average loss is due to a transient event.

29. The optical communication system of claim 28, wherein said second spectral profile comprises a substantially linearly increasing gain profile.

30. The optical communication system of claim 28, wherein said second spectral profile comprises a substantially linearly decreasing gain profile.

* * * * *